Oct. 29, 1963     T. W. JENKINS, JR     3,109,102
CONTROL SYSTEM FOR ELECTRICAL GENERATING UNITS
Filed Nov. 13, 1959     3 Sheets—Sheet 1

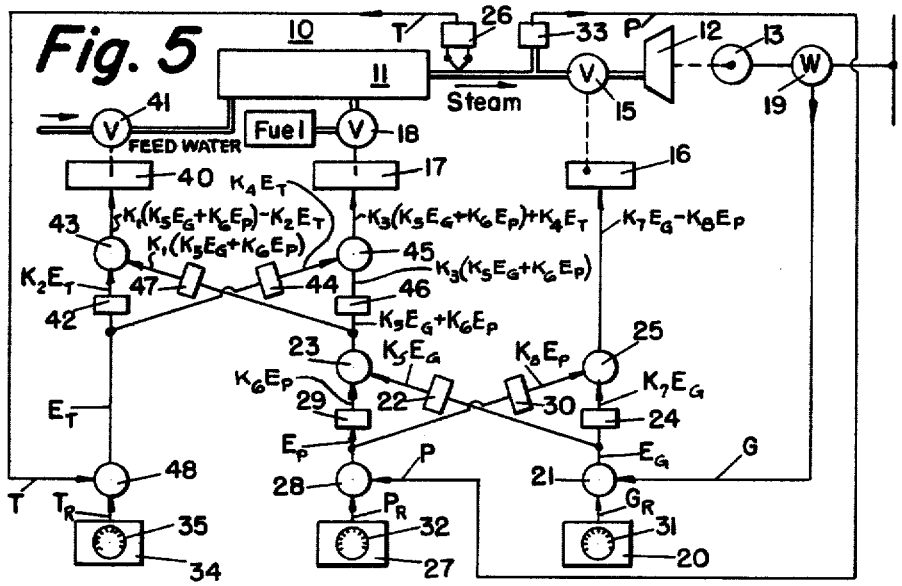

United States Patent Office 3,109,102
Patented Oct. 29, 1963

3,109,102
CONTROL SYSTEM FOR ELECTRICAL
GENERATING UNITS
Theron W. Jenkins, Jr., Fort Washington, Pa., assignor to
Leeds and Northrup Company, Philadelphia, Pa., a
corporation of Pennsylvania
Filed Nov. 13, 1959, Ser. No. 852,860
13 Claims. (Cl. 290—2)

This invention relates to systems for controlling electrical generating units comprising an electrical generator, a prime mover for driving it and a vapor generator for supplying the prime mover.

The principal object of the present invention is to eliminate or minimize the interaction between control systems which for units having conventional storage-type boilers respectively regulate electrical output and steam pressure and which for units having boilers of the "once-through" type respectively regulate at least two of the interdependent operating variables, namely, electrical output, steam temperature and steam pressure. A once-through boiler may be defined as one in which water is not recirculated by is converted to vapor enroute in a single pass from the feedwater inlet to the vapor output.

In accordance with the invention, the fuel-input and vapor-output control systems are so coordinated that the rate of supply of fuel to the vapor generator is varied in accordance with the sum of signals respectively representative of the deviation from the required electrical generation and of the deviation from the required vapor pressure (vapor generator either of storage type or once-through type) or the required vapor temperature (vapor generator of the storage type) and that the rate of flow of vapor to the prime mover is in accordance with the difference of such signals.

Also in accordance with the invention, as applied to units using once-through boilers, the feedwater and fuel-input control systems are so coordinated that the rate of supply of feedwater to the vapor generator may be varied in accordance with the difference of signals respectively representative of the deviations from the required temperature and pressure of vapor available for the prime mover and the rate of supply of fuel to the vapor generator is varied in accordance with the sum of said deviation signals.

Also in accordance with the invention, as applied to units having once-through boilers, control systems for the unit are so coordinated that the rate of supply of vapor to the prime mover may be varied in accordance with the difference of signals respectively representative of the deviation from the required generation and of the deviation from the required vapor pressure; the rate of supply of fuel is varied in accordance with the sum of signals respectively representative of the deviations from required generation, required vapor pressure and from required vapor temperature; and the rate of supply of feedwater is varied in accordance with the difference between a signal representing the sum of the deviations from the required electrical generation and from the required vapor pressure and a signal representing the deviation from the required vapor temperature.

The invention further resides in coordinated control systems having the features of construction, combination and arrangement hereinafter described and claimed.

For a more detailed understanding of the invention and for illustration of various embodiments thereof, reference is made in the following description to the accompanying drawings in which:

FIG. 1 is a block diagram of a control system for coordination of the steam pressure and generation controls of fuel and throttle;

FIG. 2 schematically illustrates dual control networks suited for the systems shown in FIGS. 1, 3 and 4;

FIG. 5 is a block diagram of a control system for coordination of the steam pressure, steam temperature and generation controls of fuel, throttle and feedwater; and FIG. 6 schematically illustrates electrical networks suited for use in the system of FIG. 5.

Figure 1:
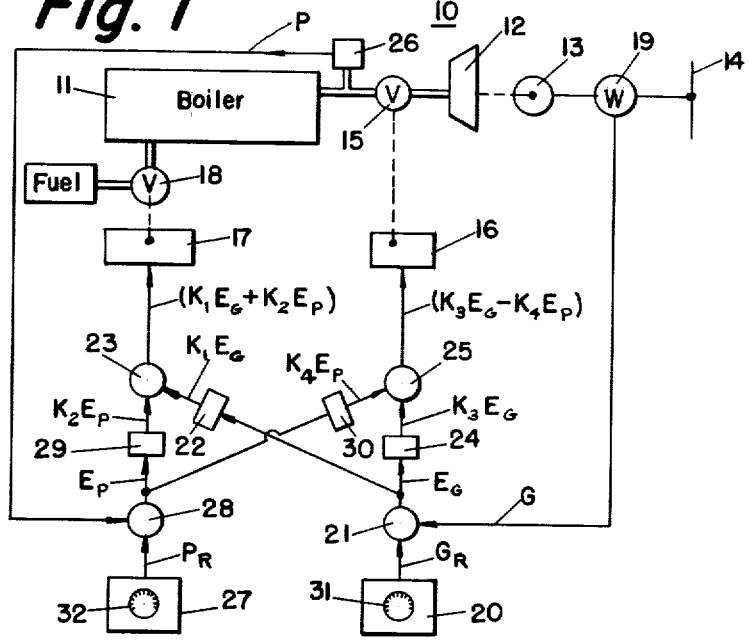

Referring to FIG. 1, the electrical generating unit 10 comprises a boiler or vapor generator 11, a turbine or other prime mover 12 supplied with steam or other motive vapor by boiler 11, and an alternator or other electrical generator 13 driven by the prime mover 12 and supplying electrical power to the line 14 of a distribution network. The throttle valve 15 for regulating the supply of vapor from the boiler 11 to the turbine 12 is adjusted by the controller 16 either directly or, more usually, by a flyball governor (not shown) driven by the prime mover and whose speed setting is varied by controller 16. The rate of supply of fuel to the boiler is regulated by controller 17 which adjusts the position of a control element 18 suited for the particular type of fossil or non-fossil fuel including coal, oil, gas or radio-active fuel.

As hereinafter explained, each of the controllers 16 and 17 responds to changes in generation and vapor pressure to provide corrections in generation without requiring a steam pressure disturbance and to provide corrections to steam pressure without requiring a generation error.

The actual generation of alternator 13, as measured by wattmeter 19 for example, produces a signal G having a characteristic which varies as a function of generation. For example, the signal G may be a voltage whose magnitude increases and decreases with increase and decrease of the electrical power supplied by generator 13 to the power line 14. The electrical generation required of unit 10 to meet its share of the generation requirement of the station or area in which it is located is represented by signal $G_R$. For simplicity of explanation, it is first assumed that unit 10 is to operate on a fixed base load and the operator sets the dial of the required-generation signal-producing means 20 to produce a signal $G_R$ of magnitude representative of the required generation.

The actual-generation signal G and the required-generation signal $G_R$ are impressed upon a comparator 21 of suitable type to produce an error signal $E_G$ corresponding in sense and magnitude with any deviation of the actual generation from the required generation. This error signal effectively multiplied by an operating factor or coefficient $K_1$ introduced by attenuator 22 is applied as the modified generation-error signal $K_1E_G$ to the combining device 23 in the input system of the fuel controller 17. The generation-error signal $E_G$ effectively multiplied by another preselected operating factor or coefficient $K_3$ introduced by attenuator 24 is applied as the modified generation-error signal $K_3E_G$ to the combining device 25 in the input system of the throttle controller 16. Thus, whenever the actual generation of unit 10 does not match its required generation, a generation-error signal appears in the input systems of both of the controllers 16, 17.

The pressure of the steam available for supply through the throttle valve 15 to the turbine 12 is measured by a suitable pressure-responsive device 26 which produces a signal P having a characteristic which varies as a function of the actual steam pressure. For example, signal P may be a voltage which increases and decreases with increase and decrease of the actual pressure of the steam on the inlet side of the throttle. The required steam pressure is represented by signal $P_R$ produced by a suitable device 27 which may be set by the operator.

The required-pressure signal and the actual-pressure signal are impressed upon a comparator 28 of suitable type to produce an error signal $E_P$ corresponding in sense and magnitude with any existing deviation of the actual steam pressure from the required steam pressure. This error signal effectively multiplied by an operating factor $K_2$ introduced by attenuator 29 is applied as the modified pressure-error signal $K_2E_P$ to the signal-combiner 23 in the input system of the fuel-controller 17. The pressure-error signal $E_P$ effectively multiplied by another operating coefficient $K_4$, introduced by attenuator 30, is applied as the modified pressure-error signal $K_4E_P$ to signal-combiner 25 in the input system of the throttle controller 16. Thus, whenever the actual pressure of the steam on the inlet side of the throttle does not match the required steam pressure, a pressure-error signal appears in the input system of both of the controllers 16, 17.

The signal output of signal-combiner 23 in the input system of fuel controller 17 is the sum of any existing generation-error signal $K_1E_G$ and of any existing pressure-error signal $K_2E_P$ whereas the signal output of signal-combiner 25 in the input system of throttle controller 16 is the difference between any existing generation-error signal $K_3E_G$ and any existing pressure-error signal $K_4E_P$. Otherwise stated, the generation-error signals existing at any time are effective to tend to change the rate of supply of fuel and rate of steam flow to the turbine in the same sense whereas the pressure-error signals existing at any time are effective to tend to change the rate of supply of fuel and the rate of flow of steam to the turbine in opposite senses. More specifically for example, when the actual generation must be increased to meet the generation requirement, the signal $E_G$ as applied to controllers 16 and 17 calls for an increased throttle opening and an increased rate of supply of fuel to boiler 11; conversely, when the actual generation must be decreased to meet the generation requirement of unit 10, the signal $E_G$ as applied to controllers 16 and 17 calls for decreased throttle opening and decreased rate of supply of fuel. When the actual steam pressure must be increased to meet the pressure requirement, the signal $E_P$ as applied to controllers 16 and 17 calls for decreased throttle opening and an increased rate of fuel supply; conversely, when the actual steam pressure must be decreased to meet the pressure requirement, the signal $E_P$ as applied to controllers 16 and 17 calls for an increased throttle opening and a decreased rate of supply of fuel.

If for any reason there is a fuel deficiency, both the pressure and the generation will be low compared to their respective set points. In such case, the controller 17 in response to the sum of the pressure-deviation and generation-deviation signals effects an adjustment of the fuel control device 18 to increase the rate of fuel supply. However, the difference of these signals as appearing in the input system of controller 16 is effectively zero and no adjustment of the throttle 15 is effected.

If for any reason the throttle opening is insufficient, the generation will be below its set point and the pressure will be above its set point. In such case, the sum of the error signals $E_G$ and $E_P$, as appearing in the input system of controller 17, is effectively zero and there is no change in setting of the fuel valve 18 or equivalent. However, the difference of the error signals as appearing in the input circuit of controller 16 is of finite value calling for an increased opening of the throttle.

Figure 2:
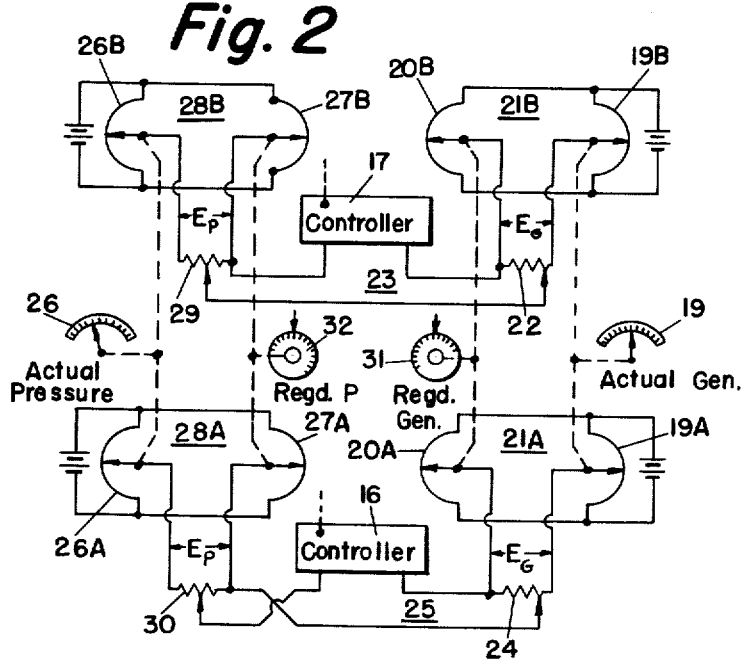

As exemplary of arrangements for producing, combining and applying the error signals as above described, reference is made to FIG. 2. The required generation of unit 10 is set by adjusting dial 31 which is coupled to slidewires 20A and 20B to produce in each of networks 21A and 21B a signal voltage representative of the required generation. The slidewires 19A, 19B are coupled for simultaneous movement by the wattmeter 19 or equivalent to produce in each of networks 21A and 21B a signal voltage representative of the actual generation. Each of the networks 21A, 21B is of the bridge or potentiometer type for comparing the required and actual generation signals and for producing an output voltage $E_G$ which varies in sense and magnitude with the deviation of the actual generation from the required generation.

The required operating pressure of the boiler 11 of unit 10 is set by adjusting dial 32 which is coupled to slidewires 27A, 27B to produce in each of networks 28A, 28B a signal voltage representative of the required pressure. The slide wires 26A, 26B are coupled for concurrent adjustment by the pressure-responsive device 26 to produce in comparator networks 28A and 28B a signal voltage representative of the actual steam pressure. Each of the networks 28A, 28B produces an output voltage $E_P$ which varies in sense and magnitude with the deviation of the actual vapor pressure from the required value thereof.

The error signal outputs of the comparator networks 21A, 28A are combined in subtractive sense in the input circuit 25 of the throttle-controller 16. For adjustment of the relationship between the magnitudes of the error signals to suit the operating characteristics of a particular unit 10, there are provided, in the particular system shown in FIG. 2, the attenuator type adjusters 24 and 30 which effectively multiply the generation-error signal $E_G$ and the pressure-error signal $E_P$ by selected operating factors $K_3$ and $K_4$ respectively. In A.C. powered networks, the voltage-dividers 24 and 30 may be replaced by variacs (variable ratio auto transformers) to obtain selected operating coefficients which are smaller than, equal to, or greater than unity. Thus, as described in connection with FIG. 1, the generation-error signal and the pressure-error signal as applied to the throttle-controller 16 are combined in subtractive sense.

The error signal outputs of the comparator networks 21B, 28B are combined in additive sense in the first input circuit 23 of the fuel-controller 17. The relationship between the magnitudes of the error signal may be adjusted, as by the attenuators 22, 29, or their equivalent, to suit a particular installation or unit 10. Thus, as described in connection with FIG. 1, the generation-error and pressure-error signals as applied to fuel-controller 17 are combined in additive sense.

The controllers 16 and 17 of FIG. 2 may be of any suitable type and may be for example of the type shown in U.S. Letters Patent No. 2,830,245 to Davis et al.

Figure 3:
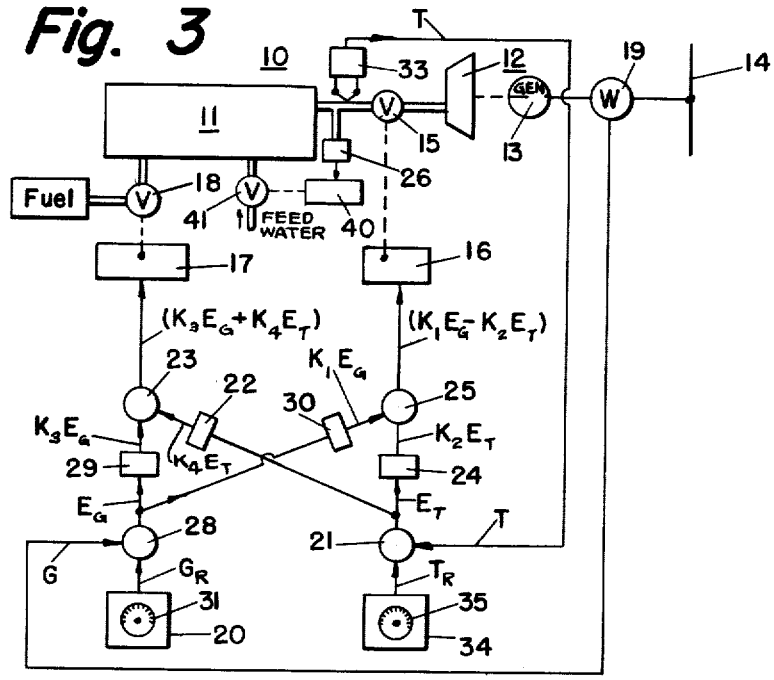
FIG. 3 is a block diagram of a control system for coordination of the steam temperature and generation control of fuel and throttle.

In the arrangement shown in FIG. 3, the directly-controlled variables of the generating unit 10 are the electrical output of the generator 13 and the temperature of the steam available for driving the prime mover 12. In this arrangement, the vapor generator 11 is of the once-through type and the vapor pressure is maintained constant by an independent control of a regulated medium such as feedwater. Specifically, the feedwater valve 41 is adjusted by controller 40 in response to changes of vapor pressure detected by pressure-responsive device 26. The fuel controller 17 varies the rate of supply of fuel to the vapor generator 11 in accordance with the sum of signals respectively representative of the deviation of the electrical generation from its required magnitude and of the deviation of the steam temperature from its required value. The controller 16 varies the throttle valve 15 in accordance with the difference of such signals.

In this arrangement, the input signals to comparator 21 are the required-temperature signal $T_R$ as set by an operator's adjustment of dial 35 of signal-producing device 34 and the actual-temperature signal $T$ as produced by a temperature-responsive device 33. The steam temperature may be measured by temperature-responsive device 33 at any point between the vapor generator and the prime mover or at any point in the vapor generator at which the vapor is in superheated state. The error-signal output $E_T$ of comparator 21 is applied, after modification by an operating coefficient $K_2$ introduced by attenuator 24 or equivalent, to the subtractor device 25 in the input system of throttle-controller 16. The error-signal output $E_T$ of comparator 21 is also applied, after modification by an operating coefficient $K_4$ introduced by attenuator 22, to the adder device 23 in the input system of fuel-controller 17.

The input-signals to comparator 28 in this arrangement are the required-generation signal $G_R$ and the actual-generation signal $G$ respectively produced as in FIG. 1 but there applied to comparator 21. The error-signal output $E_G$ of comparator 28 is applied, after modification by an operating coefficient $K_3$ introduced by attenuator 29, to the adder device 23 in the input system of fuel controller 17. The error signal $E_G$ is also applied, after modification by an operating coefficient $K_1$ introduced by attenuator 30, to the subtractor device 25 in the input system of throttle controller 16.

Thus, the signal input to the throttle-controller 16 is the difference between any existing generation-error signal $K_1 E_G$ and any existing temperature-error signal $K_2 E_T$: the signal input to the fuel-controller 17 is the sum of any existing generation-error signal $K_3 E_G$ and any existing temperature-error signal $K_4 E_T$.

In the absence of any generation-error signal, the existence of a temperature-error signal will cause the controllers 16 and 17 to respond in opposite senses: specifically, if the temperature is low, the controller 16 will increase the rate of supply of fuel and controller 17 will reduce the throttle opening whereas if the temperature is high, the controller 17 will decrease the rate of supply of fuel and controller 16 will increase the throttle opening. By such control action of controllers 16 and 17, the correction of steam temperature is effected with little or no disturbance of the electrical output of generator 13.

In absence of any temperature-error signal, the existence of a generation-error signal will cause the controllers 16 and 17 to respond in the same sense: specifically, if the generation is below that required, the controller 17 will increase the rate of supply of fuel and controller 16 will increase the throttle opening whereas if the generation is above that required, the controller 17 will decrease the rate of supply of fuel and controller 16 will decrease the throttle opening. By such control action of controllers 16 and 17, the correction of generation is effected with little or no disturbance of the steam temperature.

If for any reason such as lower quality of fuel, the rate of fuel supply is too low, both the steam temperature and the electrical generation will be low compared to their respective set points. In such case, the controller 17 responds to the sum of the temperature-deviation and generation-deviation signals to increase the rate of supply of fuel. However, the difference of these signals as appearing in the input circuit of controller 16 is effectively zero and no adjustment of the throttle is effected.

If for any reason the throttle opening is insufficient, the generation will be below its set point and the steam temperature will be above its set point. In such case, the sum of the error signals $E_G$ and $E_T$ as appearing in the input circuit of controller 17 is effectively zero and no change in the rate of supply of fuel is effected. However, the difference of the error signals as appearing in the input circuit of controller 16 is of finite value calling for an increased throttle opening.

Figure 4:
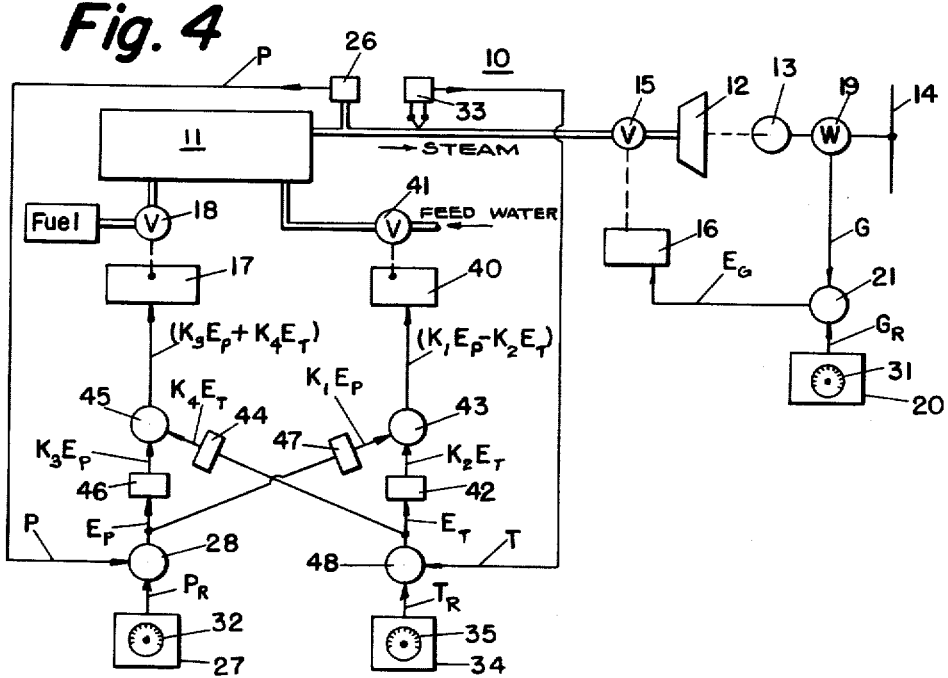
FIG. 4 is a block diagram of a control system for coordination of the steam pressure and steam temperature controls of fuel and feedwater.

In the arrangement shown in FIG. 4, the directly controlled operating variables of the generating unit 10 are electrical generation, steam-temperature and steam-pressure. In this arrangement, as in those of FIGS. 3 and 5, the vapor generator 11 is of the once-through type. The controller 17 varies the rate of supply of fuel to the boiler 11 in accordance with the sum of error signals respectively representative of the deviation of the steam pressure from its required value and of the deviation of the steam temperature from its required value. The controller 40 in response to the difference of said error signals varies the rate of supply of feedwater to boiler 11 as by adjustment of valve 41. The electrical output of generator 13 is maintained at its desired value by an independent control of throttle valve 15.

In this arrangement, the required-pressure signal $P_R$ produced by device 27 and actual-pressure signal produced by device 26 are combined in comparator 28 to produce the pressure-error signal $E_P$ corresponding in sense and magnitude with any deviation of the actual steam pressure from the required pressure as set by dial 32. This pressure-error signal, as modified by the operating factor $K_3$ introduced by attenuator 46, is applied to the signal-adding device 45 in the input circuit of the fuel controller 17. The same signal, as modified by the operating factor $K_2$ introduced by attenuator 42, is applied to the signal-subtracting device 43 in the input circuit of the feedwater controller 40.

The required-temperature signal $T_R$ produced by device 34 and the actual-temperature signal $T$ produced by device 33 are combined in comparator 48 to produce the temperature-error signal $E_T$ corresponding in sense and magnitude with any deviation of the actual steam-temperature from the required value thereof as set by dial 35. This temperature-error signal, as modified by the operating factor $K_2$ introduced by attenuator 42, is applied to the signal-subtracting device 43 in the input circuit of the feedwater controller 40. The temperature-error signal is also applied, as modified by the operating factor $K_4$ introduced by attenuator 44, to the signal-adder 45 in the input system of the fuel-controller 17.

The throttle valve 15 is regulated by controller 16 in response to any generation-error signal $E_G$ corresponding in sense and magnitude with any deviation of the actual-generation signal $G$, as produced by wattmeter 19 or equivalent, from the required-generation signal $G_R$ as set by dial 31 of the device 20. With the throttle valve so regulated to control generation at a preset value, an increase of fuel, without a change in feedwater flow, would increase both steam-temperature and steam-pressure: an increase in feedwater flow, without change in the fuel flow, would result in increased pressure and decreased temperature of the steam. Such interaction between steam-pressure and steam-temperature controls is eliminated or minimized when, as above described, the fuel-controller 17 is responsive to the sum of the temperature-error and pressure-error signals and the feedwater controller 40 is responsive to the difference of those signals.

When for example the steam-pressure is low and the steam-temperature correct, the controllers 17 and 40 respond to the pressure-error signal to increase both the fuel rate and the feedwater rate. When the steam-temperature is low and the steam-pressure correct, the controller 17 responds to the temperature-error signal to increase the fuel rate while the controller 40 responds to temperature-error signal to decrease the feedwater flow.

The coordination of fuel and feedwater controls as effected by the arrangement shown in FIG. 4 reduces the duty imposed upon the throttle controller 16 for regulation of generation even though the throttle control is not coordinated with the fuel and feedwater controls. In the arrangement shown in FIG. 5, the controls for electrical generation, steam pressure and steam temperature are all coordinated substantially to eliminate interaction of the control of any one of these variables upon any of the others. This arrangement is a composite of generation/pressure, generation/temperature and pressure/temperature control arrangements shown in FIGS. 1, 3 and 4 and since the corresponding elements are identified by the same reference characters, the description of FIG. 5 and explanation of its operation may be shortened.

In FIG. 5, as in FIG. 1, the throttle-controller 16 responds to the difference between any existing generation-error signal $E_G$ (modified by an operating factor $K_7$) and any existing pressure-error signal $E_P$ (modified by an operating factor $K_8$). In FIG. 5, the input signal of fuel-controller 17 is effectively the sum $(K_5E_G+K_6E_P)$ of generation-error and pressure-error signals as in FIG. 1 plus the sum $(K_5E_G+K_4E_T)$ of generation error and temperature-error signals as in FIG. 3 plus the sum $(K_6E_P+K_4E_T)$ of pressure-error and temperature-error signals as in FIG. 4. In FIG. 5, the input signal of feedwater controller 40 is the difference $(K_6E_P-K_2E_T)$ of pressure-error and temperature-error signals as in FIG. 4 and, unlike any of the preceding figures, the difference $(K_5E_G-K_2E_T)$ of generation-error and temperature-error.

Thus, if generation is low with steam-pressure and steam-temperature at their required values, all of the controllers 16, 17 and 40 respond to the generation-error signal to increase the throttle opening, to increase the fuel rate and to increase the feedwater rate. If the steam-pressure is low with generation and steam-temperature at their required values, the controller 16 responds to the pressure-error signal to decrease the throttle opening and controllers 17 and 40 respond to the pressure-error signal to increase the rates of supply of fuel and feedwater. If the steam-temperature is low, the controller 17 responds to the temperature-error signal to increase the fuel rate and controller 40 responds to the temperature-error signal to decrease the feedwater flow; the throttle controller 16 does not respond because temperature-error signals are not introduced into its input system.

A control system using electrical networks for producing, combining and employing signals as above described in connection with FIG. 5 is shown in FIG. 6. The corresponding elements are identified by the same reference characters so that the description of FIG. 6 may be relatively brief. As evident from comparison of FIGS. 2 and 6, there is used the same arrangement for producing the difference of the generation-error and pressure-error signals in the input circuit of the throttle-controller 16. Also as in FIG. 2, the generation-error and pressure-error signals are added in the input system of the fuel-controller 17: in FIG. 6 however, that input system additionally includes means for producing a temperature-error signal voltage $E_T$.

Specifically, the slidewire 34B of the bridge network 48B is set by dial 35 to produce a signal voltage $T_R$ corresponding with the required steam temperature. The slidewire 33B is adjusted by the temperature-responsive instrument 33 to produce a signal voltage T corresponding with the actual steam temperature. Thus, upon any deviation of the actual steam-temperature from its preset required value, the network 48B produces a temperature-error signal voltage $E_T$ corresponding in sense and magnitude with the temperature deviation. As modified by the setting of attenuator 44, the temperature-error voltage $E_T$ is added to the sum of the generation-error and pressure-error voltages as modified by attenuator 46.

In FIG. 6, there are additionally provided the slidewires 20C and 27C respectively set in accordance with the required generation and the required steam-pressure by dials 31 and 32. These slidewires are included in the bridge networks 21C, 28C which respectively include the slidewires 19C, 26C adjusted respectively by the wattmeter 19 and the pressure-responsive device 26. The generation-error signal voltage $E_G$, as produced by network 21C and as modified by the setting of attenuator 22C, is added in network 23C to the pressure-error signal voltage $E_P$ as produced by network 28C and modified by attenuator 29C. The sum of these error signal voltages, as modified by the attenuator 47, appears in the input circuit 43 of the feedwater controller 40 into which there is introduced, in subtractive sense, the temperature-error signal voltage $E_T$ as modified by attenuator 42 in the output circuit of network 48C.

This network includes slidewire 34C set by dial 35 in accordance with the required steam-temperature and slidewire 33C adjusted by instrument 33 in accordance with variations of the actual steam-temperature.

The coordinated operation of the controllers 16, 17 and 40 of FIG. 6 is the same as in FIG. 5 and accordingly the description thereof need not be repeated.

What is claimed is:

1. A control system for controlling an electrical generating unit including a vapor generator, a prime mover supplied from said vapor generator, and an electrical generator driven by said prime mover and connected to a power distribution network, said control system comprising means for producing a first error signal representative of the deviation of the actual electrical generation of said unit from the required electrical generation thereof, means for producing a second error signal representative of the deviation of the actual pressure of vapor produced by said vapor generator from the required pressure thereof, a first control means responsive to the effective sum of said first and second error signals for varying the rate of supply of fuel to said vapor generator, and a second control means responsive to the effective difference between said first and second error signals for varying the rate of supply of vapor from said vapor generator to said prime mover.

2. A control system for controlling an electrical generating unit including a vapor generator of the once-through type, a prime mover supplied from said vapor generator, and an electrical generator driven by said prime mover and connected to a power distribution network, said control system comprising means for producing a first error signal representative of the deviation of the actual electrical generation of said unit from the required electrical generation thereof, means for producing a second error signal representative of the deviation of the actual temperature of vapor generated by said vapor generator from the required temperature thereof, a first control means responsive to the effective sum of said first and second error signals for varying the rate of supply of fuel to said vapor generator, and a second control means responsive to the effective difference of said signals for varying the rate of supply of vapor from said vapor generator to said prime mover.

3. A control system for controlling an electrical generating unit including a vapor generator of the once-through type, a prime mover supplied from said vapor generator, and an electrical generator driven by said prime mover and connected to a power distribution network, said control system comprising means for producing a first error signal representative of the deviation of the actual pressure of vapor produced by said vapor generator from the required pressure thereof, means for producing a second error signal representative of the deviation of the actual temperature of vapor produced by said vapor generator from the required temperature thereof, a first control means responsive to the effective sum of said first and second error signals for varying the rate of supply of fuel to said vapor generator, and a second control means responsive to the effective difference of said signals for varying the rate of supply of feedwater to said vapor generator.

4. A control system for controlling an electrical generating unit including a vapor generator of the once-through type, a prime mover supplied from said vapor generator, and an electrical generator driven by said prime mover and connected to a power distribution network, said control system comprising means for producing a first error signal representative of the deviation of the actual electrical generation of said unit from the required electrical generation thereof, means for producing a second error signal representative of the deviation of the actual pressure of vapor produced by said vapor generator from the required pressure thereof, means for producing a third error signal representative of the deviation of the actual temperature of vapor produced by said vapor generator from the required temperature thereof, a first control means responsive to the effective sum of said first, second and third error signals for varying the rate of supply of fuel to said vapor generator, a second control means responsive to the effective difference between said first and second error signals for varying the rate of supply of vapor from said vapor generator to said prime mover, and a third control means responsive to the effective difference between said third error signal and the sum of said first and second error signals for varying the rate of supply of feedwater to said vapor generator.

5. A control system for controlling an electrical generating unit including a vapor generator, a prime mover supplied from said vapor generator, and an electrical generator driven by said prime mover, said control system comprising means for producing a first error signal ($E_G$) in sense and magnitude corresponding with the deviation of the actual electrical generation of said unit from the required electrical generation thereof, means for producing a second error signal ($E_P$) in sense and magnitude corresponding with the deviation of the actual pressure of vapor produced by said vapor generator from the required pressure thereof, a first pair of attenuators for respectively effectively multiplying said first and second error signals by preselected coefficients to produce a first pair of modified error signals, a first control means responsive to the sum of said first pair of modified error signals for varying the rate of supply of fuel to said vapor generator, a second pair of attenuators for respectively effectively multiplying said first and second error signals by preselected coefficients to produce a second pair of modified error signals, and a second control means responsive to the difference of said second pair of modified error signals for varying the rate of supply of vapor from said vapor generator to said prime mover.

6. A control system for controlling an electrical generating unit including a vapor generator of the once-through type, a prime mover supplied from said vapor generator, and an electrical generator driven by said prime mover, said control system comprising means for producing a first error signal ($E_G$) in sense and magnitude coresponding with the deviation of the actual electrical generation of said unit from the required electrical generation thereof, means for producing a second error signal ($E_T$) in sense and magnitude corresponding with the deviation of the actual temperature of vapor produced by said vapor generator from the required temperature thereof, a first pair of attenuators for respectively effectively multiplying said first and second error signals by preselected coefficients ($K_3$; $K_4$) to produce a first pair of modified error signals ($K_3E_G$; $K_4E_T$); a first control means responsive to the sum ($K_3E_G+K_4E_T$) of said first pair of modified error signals for varying the rate of supply of fuel to said vapor generator, a second pair of attenuators for respectively effectively multiplying said first and second error signals by preselected coefficients ($K_1$; $K_2$) to produce a second pair of modified error signals ($K_1E_G$; $K_2E_T$), and a second control means responsive to the difference ($K_1E_G-K_2E_T$) of said second pair of modified error signals for varying the rate of supply of vapor from said vapor generator to said prime mover.

7. A control system for controlling an electrical generating unit including a vapor generator of the once-through type, a prime mover supplied from said vapor generator, and an electrical generator driven by said prime mover, said control system comprising means for producing a first error signal ($E_P$) in sense and magnitude corresponding with the deviation of the actual pressure of vapor produced by said vapor generator from the required pressure thereof, means for producing a second error signal ($E_T$) in sense and magnitude corresponding with the deviation of the actual temperature of vapor produced by said vapor generator from the required temperature thereof, a first pair of attenuators for respectively effectively multiplying said first and second error signals by preselected coefficients ($K_3$; $K_4$) to produce a first pair of modified error signals ($K_3E_P$; $K_4E_T$), a first control means responsive to the sum ($K_3E_G+K_4E_T$) of said first pair of modified control signals for varying the rate of supply of fuel to said vapor generator, a second pair of attenuators for respectively effectively multiplying said first and second error signals by preselected coefficients ($K_1$; $K_2$) to produce a second pair of modified error signals ($K_1E_P$; $K_2E_T$), and a second control means responsive to the difference ($K_1E_G-K_2E_T$) of said second pair of modified error signals for varying the rate of supply of feedwater to said vapor generator.

8. A control system for controlling an electrical generating unit including a vapor generator of the once-through type, a prime mover supplied from said vapor generator, and an electrical generator driven by said prime mover, said control system comprising means for producing a first error signal ($E_G$) in sense and magnitude corresponding with the deviation of the actual electrical generation of said unit from the required electrical generation thereof, means for producing a second error signal ($E_P$) in sense and magnitude corresponding with the deviation of the actual pressure of vapor produced by said vapor generator from the required pressure thereof, means for producing a third error signal ($E_T$) in sense and magnitude corresponding with the deviation of the actual temperature of vapor produced by said vapor generator from the required temperature thereof, a first pair of attenuators for respectively effectively multiplying said first and second error signals by preselected coefficients ($K_7$; $K_8$) to produce a first pair of modified error signals ($K_7E_G$; $K_8E_P$), a first control means responsive to the difference ($K_7E_G-K_8E_P$) of said first pair of modified error signals for varying the rate of supply of vapor from said vapor generator to said prime mover, a second pair of attenuators for respectively effectively multiplying said first and second error signals by preselected coefficients ($K_5$; $K_6$) to produce a second pair of modified error signals ($K_5E_G$; $K_6E_P$), a third pair of attenuators for respectively effectively multiplying said third error signal and the sum of said second pair of modified error signals by preselected coefficients ($K_2$; $K_1$) to produce a third pair of modified error signals ($K_2E_T$; $K_1[K_5E_G+K_6E_P]$), a second control means responsive to the difference ($K_1[K_5E_G+K_6E_P]-K_2E_T$) of said third pair of error signals for varying the rate of supply of feedwater to said vapor generator, a fourth pair of attenuators for respectively effectively multiplying said third error signal and the sum of said second pair of modified error signals by preselected coefficients ($K_4$; $K_3$) to produce a fourth pair of modified error signals ($K_4$; $K_3[K_5E_G+K_6E_P]$); and a third control means responsive to the sum $$(K_3[K_5E_G+K_6E_P]+K_4E_T)$$

of said fourth pair of modified error signals for varying the rate of supply of fuel to said vapor generator.

9. A control system for controlling an electrical generating unit including a vapor generator, a prime mover supplied from said vapor generator, and an electrical generator driven by said prime mover and connected to a power distribution network, said control system comprising means for producing a first error signal representative of the deviation of the actual electrical generation of said unit from the required electrical generation thereof, means for producing a second error signal representative of the deviation of the magnitude of one of the interdependent variables pressure and temperature of the vapor produced by said vapor generator from the required magnitude thereof, a first control means responsive to the effective sum of said first and second error signals for varying the rate of supply of fuel to said vapor generator, and a second control means responsive to the effective difference between said first and second error signals for varying the rate of supply of vapor from said vapor generator to said prime mover.

10. A control system for controlling an electrical generating unit including a vapor generator, a prime mover supplied from said vapor generator, and an electrical generator driven by said prime mover, said control system comprising means for producing a first error signal corresponding with the deviation of the actual electrical generation of said unit from the required electrical generation thereof, means for producing a second error signal corresponding with the deviation of the magnitude of one of the interdependent variables pressure and temperature of the vapor produced by said vapor generator from the required magnitude thereof, a first pair of attenuators for respectively effectively multiplying said first and second error signals by preselected coefficients to produce a first pair of modified error signals, a first control means responsive to the sum of said first pair of modified error signals for varying the rate of supply of fuel to said vapor generator, a second pair of attenuators for respectively effectively multiplying said first and second error signals by preselected coefficients to produce a second pair of modified error signals, and a second control means responsive to the difference of said second pair of modified error signals for varying the rate of supply of vapor from said vapor generator to said prime mover.

11. A control system for controlling an electrical generating unit including a vapor generator having a feedwater input, a prime mover having a vapor input supplied from said vapor generator, and an electrical generator driven by said prime mover and connected to a power distribution network, said control means comprising means for producing at least two error signals representative of the actual deviation of two of the interdependent operating variables—electrical generation, vapor pressure and vapor temperature from the required magnitude thereof, a first control means responsive to the effective sum of said signals for varying the rate of supply of fuel to said vapor generator, and a second control means responsive to the effective difference of said signals for varying one of said inputs.

12. A control system for controlling an electrical generating unit including a vapor generator of the once-through type, a prime mover, and an electrical generator driven by said prime mover and connected to a power-distribution network, said control system comprising means for producing a first error signal representative of the deviation of actual electrical generation of said unit from the required electrical generation thereof, means for producing a second error signal representative of the deviation of the actual temperature of vapor generated by said vapor generator from the required temperature thereof, a first control means responsive to the effective sum of said first and second error signals for varying the rate of supply of fuel to said vapor generator, and a second control means responsive to the effective difference of said signals for varying the rate of supply of feedwater to said vapor generator.

13. A control system for controlling an electrical generating unit including a vapor generator having a feedwater input, a prime mover having a vapor input supplied from said vapor generator, and an electrical generator driven by said prime mover, said control system comprising means for producing at least two error signals respectively representative of the deviation of two of the interdependent operating variables—actual generation, actual vapor pressure and actual vapor temperature—from the required magnitude thereof, pairs of attenuators for respectively effectively multiplying pairs of said error signals by preselected coefficients to produce pairs of modified error signals, a first control means responsive to the effective sum of at least two of said modified error signals for varying the rate of supply of fuel to said vapor input, and a second control means responsive to the effective difference of at least said two of said modified error signals for varying one of said inputs.

References Cited in the file of this patent
UNITED STATES PATENTS

| | | |
|---|---|---|
| 2,053,061 | Bristol | Sept. 1, 1936 |
| 2,098,914 | Gorrie | Nov. 9, 1937 |
| 2,184,224 | Lucke | Dec. 19, 1939 |
| 2,243,944 | Donaldson | June 3, 1941 |
| 2,861,194 | Bristol | Nov. 18, 1958 |
| 2,895,056 | Bristol | July 14, 1959 |

UNITED STATES PATENT OFFICE
CERTIFICATE OF CORRECTION

Patent No. 3,109,102                      October 29, 1963

Theron W. Jenkins, Jr.

It is hereby certified that error appears in the above numbered patent requiring correction and that the said Letters Patent should read as corrected below.

In the drawings, Sheet 3, Fig. 5, the reference characters "26" and "33" should be interchanged, and in the upper right-hand corner, the reference character "14" should be inserted designating the short vertical line at the extreme upper right side; column 1, line 23, for "by" read -- but --; column 4, line 39, strike out "first"; column 6, line 16, for "$K_2$ introduced by attenuator 42" read -- $K_1$ introduced by attenuator 47 --; column 10, line 4, for "$(K_3 E_G + K_4 E_T)$" read -- $(K_3 E_P + K_4 E_T)$ --; line 11, for "$(K_1 E_G - K_2 E_T)$" read -- $(K_1 E_P - K_2 E_T)$ --.

Signed and sealed this 15th day of September 1964.

(SEAL)
Attest:

ERNEST W. SWIDER
Attesting Officer

EDWARD J. BRENNER
Commissioner of Patents